April 30, 1929.    M. SHAWEKER    1,710,951
URINOMETER JAR
Filed July 25, 1927
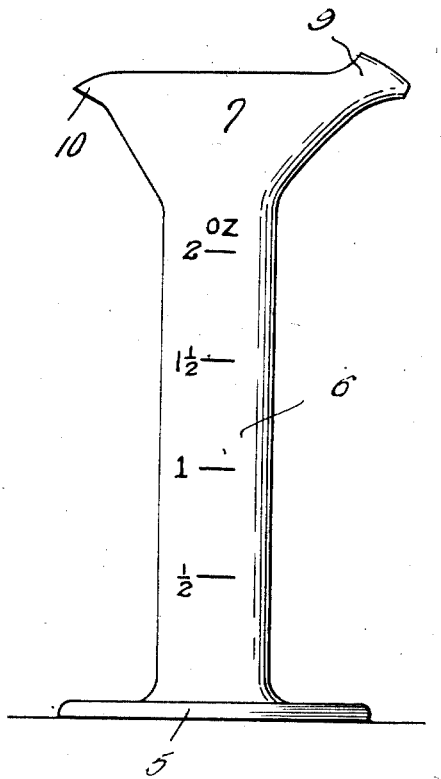
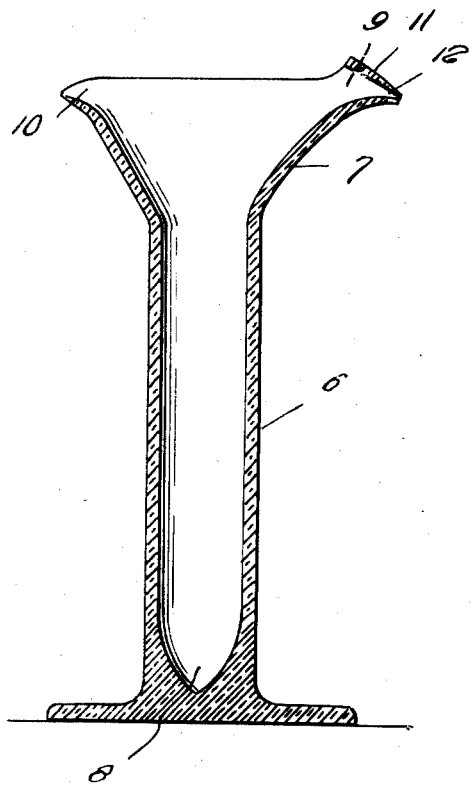
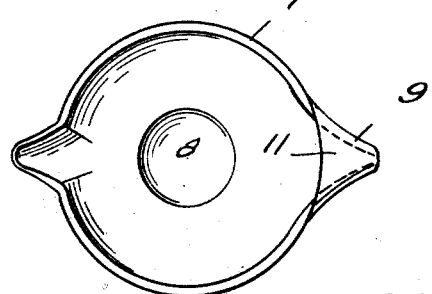
Inventor
Max Shaweker,
By Clarence A. O'Brien
Attorney Patented Apr. 30, 1929.

1,710,951

UNITED STATES PATENT OFFICE.

MAX SHAWEKER, OF DOVER, OHIO.

URINOMETER JAR.

Application filed July 25, 1927. Serial No. 208,268.

The present invention relates to a urinometer jar, and the objects and advantages thereof will be apparent from the detailed description as follows, taken in conjunction with the accompanying drawing.

In the drawing:—

Figure 1 is an elevation of the urinometer jar embodying the features of my invention.

Fig. 2 is a vertical section therethrough, and

Fig. 3 is a top plan view thereof.

This urinometer jar consists of a base 5, a cylinder 6, and a funnel top 7, all formed together integrally, preferably of glass. The bottom of the cylinder forms interiorly an apex base which may serve as a sedimentation glass. Two spouts 9 and 10 are formed in the funnel top, one of which is covered as at 11, and has a small capillary opening 12, and the other is an ordinary spout such as is used on beakers and urine jars generally.

The advantages of this jar over many other types of jars now in common use are: No funnel is needed as a filter paper can be folded and placed in the top, and the urine filtered as it is put in the jar for taking specific gravity. No dropper is required for super-laying the urine on nitric acid for the albumen or for making other contact tests as the filtered urine can be dropped directly from the capillary spout down the side wall of the tube. If it is desired to rapidly pour the urine out of the jar, the open spout is selected.

The jar can be used as a sedimentation jar; the bottom having the characteristic of one for this purpose. This jar can be made of any size and applied to as small amounts of urine as desired because the wide top will accommodate the over-flow from the top of the cylinder in case the hydrometer displaces a large amount of urine in the jar.

To illustrate, suppose we have a four ounce specimen of urine. The routine procedure would be to fold a piece of four-inch filter paper and place it in the top of the jar, it being convenient to have the edge of this filter paper impregnated with litmus or other indicator, showing the re-action of the urine which moistens it. After the jar is filled to the neck of the funnel top, the filter paper is removed, and the hydrometer is dropped into the jar. When it comes to rest, the specific gravity is taken.

A 15 cc. centrifuge tube or other tube is then partially filled with nitric acid and held in an oblique position, and the filtered urine is poured out of the capillary spout a drop at a time and is allowed to flow down the side wall and form a layer of urine above the nitric acid, without admixture of the two solutions.

Also, by using this spout, rough quantitative tests can be made for sugar and other urinary chemicals.

Then the remaining two ounces of urine, which have not been filtered, are placed in the empty jar and sedimentation allowed to occur. After which the sediment can be picked up and examined microscopically.

This apparatus reduces the glassware necessary for routine urinalysis to a minimum, and can be made as durable as any other jar at very little additional cost to the ordinary jar.

The present embodiment of the invention, is thought, has been disclosed in detail merely by way of example, since in actual practice, it attains the features of advantage enumerated as desirable in the statement of the invention and the above description.

It will be apparent that changes in the details of construction, and in the materials, and in the combination and arrangement of parts may be resorted to without departing from the spirit or scope of the invention as hereinafter claimed, or sacrificing any of its advantages.

Having thus described my invention, what I claim as new is:—

1. In a urinometer jar of the class described comprising a base, a cylinder rising from the base and having its upper end flared outwardly to form a funnel, said funnel being formed with a spout having a cover thereon, said spout being provided with an opening.

2. In a urinometer jar of the class described comprising a base, a cylinder rising from the base and having its upper end flared outwardly to form a funnel, the bottom of the cylinder being formed with an apex to function as a sedimentation glass and the funnel being provided with a pair of oppositely disposed spouts, one open and the other provided with a top to form a small opening.

In testimony whereof I affix my signature.

MAX SHAWEKER.